United States Patent [19]

Akiyama

[11] Patent Number: 4,734,757

[45] Date of Patent: Mar. 29, 1988

[54] COLOR BURST PHASE DETECTION SYSTEM FOR USE IN A VIDEO DISK PLAYER SYSTEM

[75] Inventor: Toru Akiyama, Tokorozawa, Japan

[73] Assignee: Pioneer Electronic Corporation, Tokyo, Japan

[21] Appl. No.: 874,674

[22] Filed: Jun. 16, 1986

[30] Foreign Application Priority Data

Jun. 17, 1985 [JP] Japan .................................. 60-131499

[51] Int. Cl.$^4$ ............................................ A04N 9/455
[52] U.S. Cl. ....................................... 358/19; 358/326
[58] Field of Search ....................... 358/19, 17, 35, 20, 358/326, 324, 320

[56] References Cited

U.S. PATENT DOCUMENTS

| | | | |
|---|---|---|---|
| 3,562,413 | 2/1971 | Coleman | 358/19 |
| 4,024,571 | 5/1977 | Dischert | 358/19 X |
| 4,052,233 | 10/1977 | Derenbecher, Jr. | 358/19 X |
| 4,620,219 | 10/1986 | Burrowes | 358/20 |

OTHER PUBLICATIONS

"Automatic Burst Phase Matching Arrangement for Color T.V. Camera Systems", *Technical Notes,* RCA #1309, McCoy; Mar. '83, pp. 1-15.

Primary Examiner—James J. Groody
Assistant Examiner—Victor R. Kostak
Attorney, Agent, or Firm—Schwartz, Jeffery, Schwaab, Mack, Blumenthal & Evans

[57] ABSTRACT

A system for detecting an inversion of burst phase of a video signal, includes a reference color subcarrier signal generator for generating a reference color subcarrier signal whose frequency is equal to the frequency of the color burst signal of the video signal, and a phase comparator for comparing in phase the color burst signal of the video signal and the reference color subcarrier signal. When the level change in an output signal of the phase comparator exceeds a predetermined reference level, the system produces an indication signal indicating that the burst phase of the video signal is inverted.

10 Claims, 16 Drawing Figures

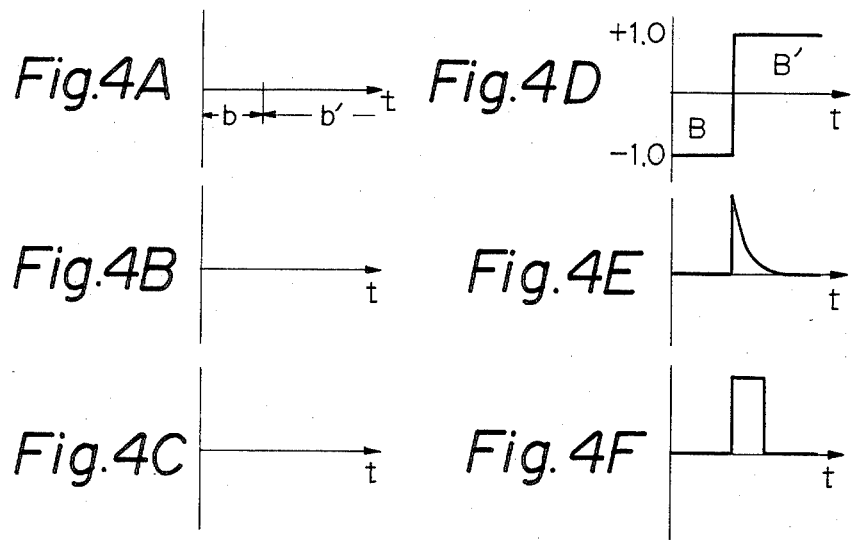
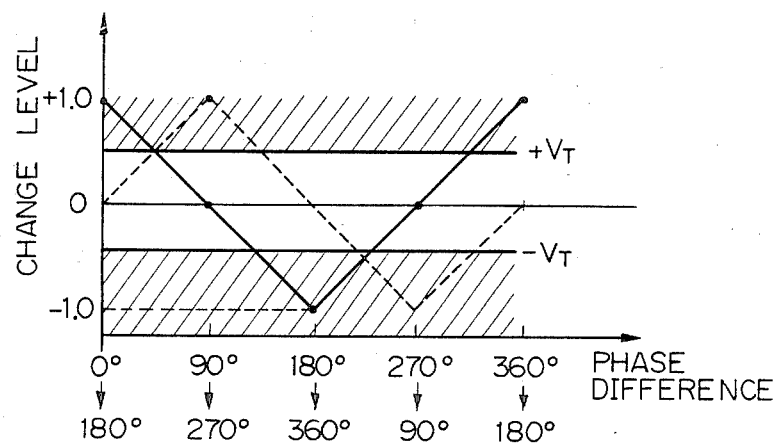

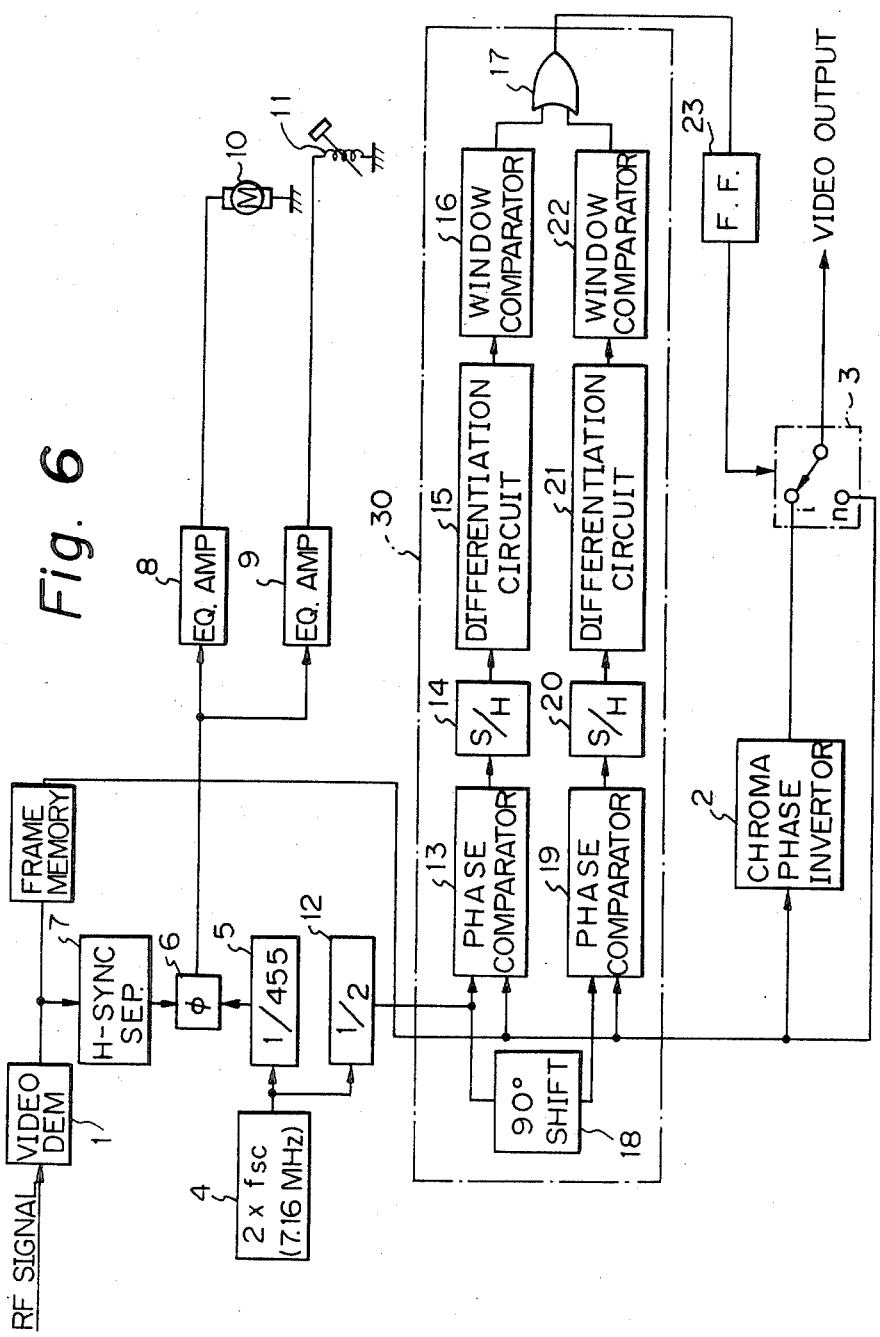

COLOR BURST PHASE DETECTION SYSTEM FOR USE IN A VIDEO DISK PLAYER SYSTEM

BACKGROUND OF THE INVENTION

1. Field of the Invention

The present invention relates to a phase detection system, and more particularly, to a system for detecting the phase of a color burst signal component of a video signal, which is suited for use in a video disk player system.

2. Description of Background Information

In connection with video disk player systems, playback operations of a CAV (Constant Angular Velocity) disk will be discussed hereinafter. In CAV disks, a composite video signal is recorded in such a manner that a video signal corresponding to one frame is recorded in every one of the recording tracks in the case of the disk having concentric recording tracks or in every circular section of the recording tracks in the case of a disk having a spiral recording track.

The relation between the frequency fsc of the color subcarrier signal and the frame frequency fF in the NTSC system is determined by the following equation:

$$fsc = (455/2) \times 525 \times fF.$$

This equation reflects the fact that the subcarrier signals recorded in a first frame and an adjacent second frame are 180° out of phase.

Since the video signal corresponding to one frame is recorded in one of the recording tracks or one circular section of the recording track, the phase difference between the subcarrier signals recorded in two adjacent recording track sections is equal to 180°.

In the case of the recording disk having a recording track of the spiral form, the continuity of the phase alternation condition of the subcarrier signal is maintained during a normal playback mode in which the recorded video format signal is picked up from an innermost part of the recording track to an outermost portion thereof. However, in addition to this normal playback mode, video disk playback systems are generally constructed to perform the so called SCAN playback mode for performing a fast speed playback operation in which an information reading point of a pickup device is moved in a radial direction across a plurality of the recording track portions. During such a SCAN playback mode, a tracking servo system of the playback system which has a tracking actuator is actuated to place the information reading point of the pickup device at each of the recording track portions on the recording disk in sequence, during the radial movement of the pickup device. However, since the movement of the tracking actuator is limited within a predetermined movable range, it is necessary to stop the tracing operation of the tracking servo system so as to put the position of the tracking actuator back to a center of the movable range.

During this period in which the tracing movement of the pickup device is stopped, the light beam for reading information moves across a plurality of recording track portions. Now, the phase relation between the color subcarrier signals of the video signals picked up before and after the crossing of the recording track portions by the pickup means will be discussed. If the number of circular track portions across which the information reading point moves is even, there will be no phase difference between the color subcarrier signals, and the continuity of the video format signal is maintained. On the other hand, if the number of track portions across which the information reading point moves is odd, the phase difference between the color subcarrier signals before and after the movement of the information reading point becomes equal to 180°. Therefore, the continuity of the video format signal is not maintained under this condition. If a playback video signal under this condition is monitored by a video monitor system, the proper hue of the video information is not reproduced when the phase of the color subcarrier signal is inverted. Thus, the reproduction of the color component of the video information becomes unstable.

One way to solve this problem is to count the number of recording track portions across which the information reading point moves, and to invert in phase the color video signal depending on whether the number of recording track portions is even or odd. However, it is generally not possible to count the number of recording track portions precisely due to noise.

Further, in the case of a picture information reproducing system using a frame memory, video signals having the same waveform are supplied from the frame memory during a freeze frame playback mode. In that case, a compensation operation is necessary to maintain the continuity of the color subcarrier signal.

SUMMARY OF THE INVENTION

The present invention is made to avoid the above mentioned problem, and an object of the present invention is therefore to provide a burst phase detection system which is able to positively detect whether the burst phase is inverted or not, using a relatively simple circuit construction and without being affected by noises or the like.

Another object of the present invention is to provide a burst phase detection system suited for use in a video information playback system having a frame memory.

According to the present invention, a burst phase detection system for a video disk player system is constructed such that a phase comparison is performed between the color burst signal in the video format signal and a reference color subcarrier signal, and the occurence of an inversion of phase of the color burst signal is detected when magnitude of the change in the comparator output signal exceeds a predetermined reference level.

In a preferred embodiment of the present invention, a pair of phase comparators having different axes of phase detection are provided as means for phase comparing the color burst signal and the color subcarrier signal. When a level change exceeding a predetermined reference level occurs in either one or both of output signals of these phase comparators, such a condition is detected as an indication of the inversion of the burst phase of the video signal.

Further scope and applicability of the present invention will become apparent from the detailed description given hereinafter. However, it should be understood that the detailed description and specific examples, while indicating a preferred embodiment of the invention, are given by way of illustration only, since various changes and modifications within the sprit and scope of the invention will become apparent to those skilled in the art from this detailed description.

BRIEF DESCRIPTION OF THE DRAWINGS

FIGS. 4A through 4F are waveform diagrams showing waveforms in various portions of the detection system for explaining the operation of the system under a condition where the phase difference between the burst signal and the reference subcarrier signal is equal to 90°;

FIG. 5 is a diagram showing the manner of changes in levels of the phase comparator when the burst phase is inverted and FIG. 6 illustrates a second embodiment of the invention.

DETAILED DESCRIPTION OF PREFERRED EMBODIMENTS

Figure 1:
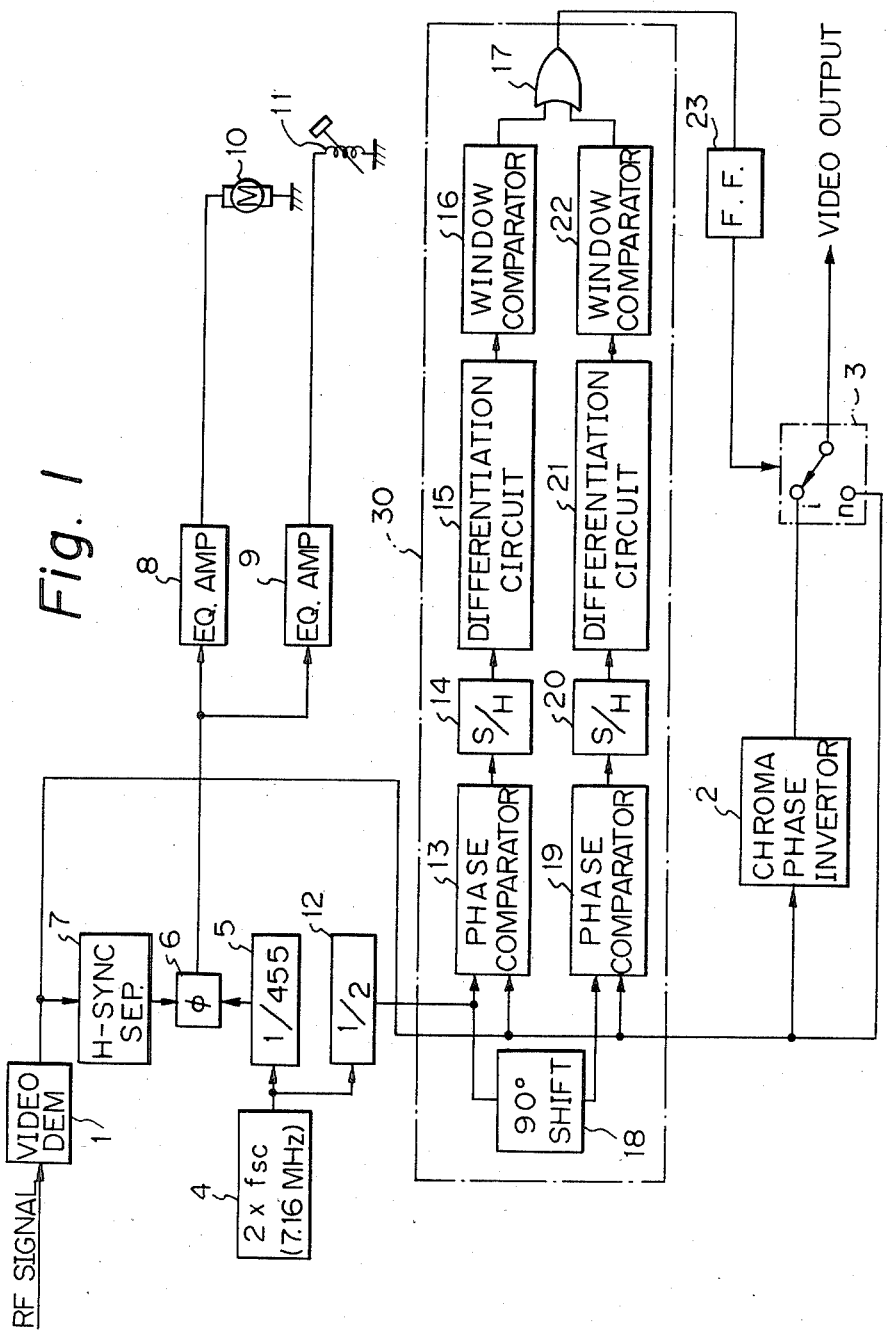
FIG. 1 is a block diagram showing an example of a video signal reproduction system in which a color burst phase detection system according to the present invention is utilized.

In the block diagram of FIG. 1, the video signal reproduction system includes a video demodulator 1 which receives a playback RF (Radio Frequency) signal and demodulates the same to a video signal. The video signal obtained at the demodulator circuit 1 is then applied to a switching circuit 3 and a chroma phase invertor 2 whose output is connected to a terminal of the switching circuit 3. At the switching circuit 3, one of the video signals from the demodulator circuit 1 and the chroma phase invertor 2 is selected as an output video signal and in turn supplied to an outside circuit.

The detection system includes a reference pulse signal oscillator 4 whose oscillation frequency (7.16 MHz) is twice the frequency (3.58 MHz) of the subcarrier signal. A reference pulse signal generated by this reference pulse signal oscillator 4 is divided at a dividing circuit 5 by a dividing factor of 1/455, to form a reference horizontal synchronization signal $f_H$ which is applied to a phase comparator 6. In the phase comparator 6, the reference horizontal synchronization signal $f_H$ is compared with a playback horizontal synchronization signal which is extracted at a horizontal synchronization signal separating circuit 7. A comparator output signal generated at the phase comparator 6 is supplied to a spindle motor 10 and a time base controller 11 through equalizer amplifiers 8 and 9 respectively. The time base controller 11, for example, consists of a tangential mirror or a delay line made up of the CCD (charge coupled device). With the above mentioned circuit parts, a time base servo loop is constructed. In this time base servo loop, the contol operation is effected so that the reference horizontal synchronization signal and the horizontal synchronization signal in the playback signal coincide in phase with each other.

An output pulse signal of the reference pulse signal oscillator 4 is divided by 2 at a divider 12 to form a reference subcarrier signal fsc of 3.58 MHz. This reference subcarrier signal fsc is phase compared, at a phase comparator 13, with a playback video signal. An output signal of the phase comparator 13 is supplied to a burst S/H (sample and hold) circuit 14 in which the phase difference within the burst period is detected. An output of the burst S/H circuit 14 is then supplied to a differentiation circuit 15 in which the input signal is differentiated, and an output signal of the differentiation circuit 15 is supplied to an input terminal of an OR gate 17 through a window comparator 16. Further, the reference subcarrier signal fsc is supplied to a 90° phase shift circuit 18 in which the input signal is phase shifted by 90°. An output signal of the phase shift circuit 18 is in turn supplied to a phase comparator 19 whose phase detection axis is substantially perpendicular to that of the phase comparator 13, in which the output signal of the phase shift circuit 18 is phase compared with the playback video signal. An output signal of the phase comparator 19 is in turn supplied to a burst S/H circuit 20 in which the phase difference within the burst period is detected. Further, an output signal of the burst phase S/H circuit 20 is differentiated at a differentiation circuit 21 and in turn supplied to the other input terminal of the OR gate 17 through a window comparator 22. An output signal of the OR gate 17 forms an inversion detection signal which represents the condition in which the burst phase of the video signal is inverted. The above explained circuit part enclosed by a partly dotted line forms a detection part of the burst phase inversion detection system which is generally denoted by 30.

An inversion detection signal generated by this detection part 30 of the burst phase inversion detection system is supplied to a flip-flop circuit 23 as a trigger signal, and an output signal of the flip-flop circuit 23 is supplied to the switch circuit 3 as a switch control signal.

The operation of the thus constructed color burst phase detection system will be explained hereinafter.

The operation of the circuit part including the phase comparator 13 will be explained first. The phase comparison between the reference subcarrier signal fsc and the color burst signal is performed in the phase comparator 13 and the burst S/H circuit 14. A change in the level of the phase comparison signal occurs when the chroma phase is inverted after the information reading point has moved across a plurality of track portions for the scanning operation. This level change is detected by the differentiation circuit 15 and transformed to a pulse signal at the window comparator 16 of the next stage. This pulse signal is supplied, as the detection signal of the inversion of the phase alternation condition, to the flip-flop circuit 23 through the OR gate 17. The state of the flip-flop circuit 23 in changed in response to edges of the pulse signal. If the switch 3 is in a position i before the infomation reading point crosses the track portions, the switch position changes to a position n after the crossing of tracks, to select the video signal supplied directly from the demodulator 1. With this operation, even when the information reading point crosses the recording tracks, the output video signal will have the subcarrier signal in continuous form.

For the phase comparators 13 and 19, general multiplier type circuits can be used. Since the axes of the phase detection of the phase comparators 13 and 19 are selected to be substantially perpendicular to each other, two phase comparing characteristics as shown in FIG. 2 are obtained.

Figure 2:
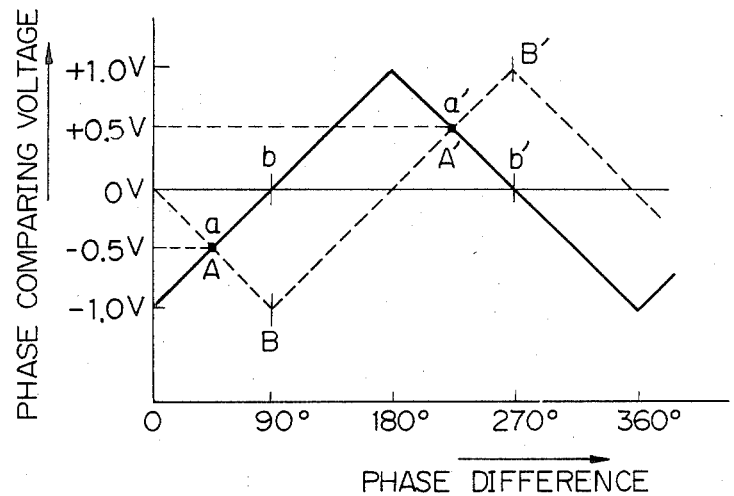
FIG. 2 is a diagram showing a phase comparision characteristic performed by the pair of phase comparator circuits utilized in the circuit of FIG. 1.

Assume that the phase difference between the burst signal and the reference subcarrier signal fsc is equal to 45°, the output signal of the phase comparator 13 is indicated by a point a in FIG. 2. In this state, the output signal level of the phase comparator 13 is equal to −0.5

Figure 3A:
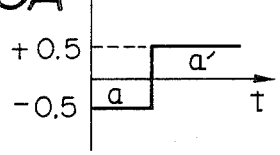
FIGS. 3A through 3F are waveform diagrams showing waveforms in various portions of the detection system for explaining the operation of the system under a condition where the phase difference between the burst signal and the reference subcarrier signal is equal to 45°.
Figure 3B:
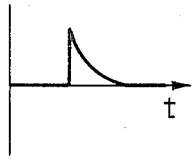
Figure 3C:
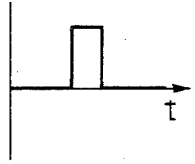

V. When, thereafter, the information reading point has crossed the tracks to invert the phase of the burst signal, the phase difference is expressed by: 45°+180°=225°. Under this condition, the operation of the phase comparator 13 is indicated by the point a' and the output signal level of the phase comparator 13 becomes equal to +0.5 V. In other words, as shown by FIG. 3A, the change in the phase comparing voltage (a) from −0.5 V to +0.5 V is detected by the differentiation circuit 15 which provide a differentiator output signal as shown in FIG. 3B. A waveform shaping of the differentiator output signal is in turn effected in the window comparator 16 to provide a pulse signal shown in FIG. 3C. Thus, the detection of the inversion of the burst phase is performed.

Figure 3D:
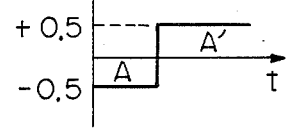
Figure 3E:
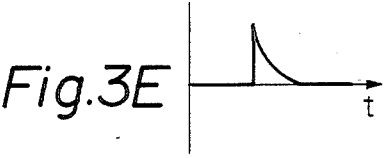
Figure 3F:
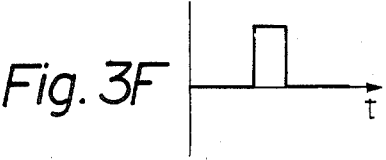

The operation of the circuit part including the phase comparator 19 is performed in the same manner during this period. As illustrated, in FIG. 2, the operation is expressed by a movement from a point A which is coincident with the point a to a point A' which is coincident with the point a'. This operation of the circuit part including the phase comparator 19 is also illustrated in FIG. 3D through 3F. Under this condition, the detection of the inversion of the phase is detected by both of the circuit part including the phase comparator 13 and the circuit part including the phase comparator 19. Thus, the inversion detection signal is derived at an output terminal of the OR gate 17. In addition, the polarity of the differentiator output signal also becomes negative when the change in phase occurs in the reverse direction, i.e. from the point a' (A') to the point a (A). However, the phase inversion of 180°, can be detected in the same manner by means of the operation of the window comparators 16 and 22.

Next, the operation of the system when the phase difference between the burst signal and the reference subcarrier signal fsc is equal to 90°, will be explained. As will be appreciated from FIG. 2, the operation of the phase comparator 13 is shown by movement from a point b to a point b'. Therefore, if the burst phase is shifed by 180° (from 90° to 270°), there will be no change in the phase comparator voltage (a), as shown in FIGS. 4A through 4C. Therefore, under this condition, it is not possible to detect the inversion of the phase by the circuit part including the phase comparator 13. However, by the circuit part including the phase comparator 19, the detection operation is attained as illustrated by the movement from a point B to a point B' so that the phase comparison voltage (a) changes from −1.0 V to +1.0 V as illustrated in FIG. 4D through FIG. 4F. This change is then detected by the differentiation circuit 21, and a differentiation output signal from the differentiation circuit 21 as shown in FIG. 4E is treated by the window comparator 22 acting as a waveform shaping circuit so that a pulse signal as shown in FIG. 4F is produced. Thus, the detection of inversion of the burst phase alternation condition is also performed in this state.

FIG. 5 shows the level change in the output signals of the phase comparators 13 and 19 when the phase of the burst signal is inverted (or in other words, shifted by 180°). In this figure, the solid line shows the variation of the output signal level of the phase comparator 13, and the dashed line shows the change in the output signal of the phase comparator 19. Since the window comparators 16 and 22 are constructed in the same manner, the threshold level $+V_T$, $-V_T$ are set at $\pm 0.5$ V in the example of FIG. 5. Thus, the inversion of the phase can be detected without regard to the phase difference between the burst signal and the reference subcarrier signal fsc. Practically, it is desirable to set the threshold levels $+V_T$ and $-V_T$ at $+0.4$ V to leave a margin.

In the above embodiment, a pair of phase comparators are utilized for detecting the inversion of the phase of the burst signal. However, the construction of the system is not limited to that of the described embodiment. As an example, a single phase comparator (for instance, only the phase comparator 13) may be used for detecting the phase inversion of the color burst signal. In that case, the level change is limited to a range illustrated by the solid line of FIG. 5, i.e., the range of the detection of the phase inversion is narrower than that of the previous case in which a pair of phase comparators are utilized. Therefore, it is necessary to set the threshold levels $+V_T$ and $-V_T$ of the window comparator 16 at small levels. However, even with small threshold levels, it is not possible to detect the inversion when the phase difference between the burst signal and the reference subcarrier signal fsc is near 180°.

To prevent this problem, it is conceivable to maintain the phase difference between the burst signal and the reference subcarrier signal always at 45° (or 225°). However, the time base servo control is performed by a phase comparison between the reference horizontal synchronization signal fH obtained by dividing 2 fsc by 455 and the playback horizontal synchronization signal. Therefore, to lock the phase difference between the subcarrier signal fsc and the color burst signal of the playback video signal at 45°, it is necessary to maintain the stationary error of the servo loop and the deviation of the delay time of the divider 5 less than the order of ±5 nsec, for example. However, this is practically difficult.

Therefore, it is desirable to provide a pair of phase comparators 13 and 19 for detecting the inversion of the burst phase. In such a case, as mentioned above, the detection of the inversion of phase can be performed for the whole range of the phase difference between the burst signal and the reference subcarrier signal. In other words, it does not become a burden to the time base servo system.

In the above embodiment, the color burst phase detection system according to the invention is utilized for maintaining the continuity of chroma signal of the playback video signal, especially from a video disk player system during a scan operation. However, the application of the invention is not limited to this. As an example, the system can be utilized for maintaining the continuity of the chroma signal during a multi-track jump operation in the above mentioned disk player system. Further, the invention is applicable as a burst phase continuity detection circuit which maintains the continuity of the burst phase in a picture reproduction system which uses a frame memory system, such as described in U.S. patent application Ser. No. 848,264 which is based on Japanese patent application No. 60-73044, and assigned to the same assignee of the present application. In such a picture reproduction system using a frame memory, it is necessary to produce video signals having the same waveform from the video memory (frame memory or field memory) during a freeze frame playback mode. Therefore, discontinuity of the playback color subcarrier signal occurs every one frame, that is, every two fields in the case of the frame memory. For this reason, a phase compensation process after the output stage of the frame memory is needed for maintaining the continuity of the color subcarrier signal. By employing the color burst phase detection system according to the present invention, the phase inversion of the color subcarrier signal is surely detected with ease, irrespective of the phase of the playback burst signal relative to the reference color subcarrier signal. More specifically, in the picture reproduction system described in the above Japanese patent application, a switch circuit is provided for performing the selection between a playback video signal supplied from a digital to analog converter and the same playback video signal which is supplied through a delay line. The operation of the switch circuit is controlled by an output signal of a burst continuity detection circuit. In this construction, the color burst phase detection system according to the present invention can be used as the burst continuity detection circuit, to control the operation of the switch circuit. Thus, the continuity of the color subcarrier signal is surely maintained by the system according to the present invention also in the picture reproduction system utilizing a frame memory.

It will be appreciated from the foregoing, that in the burst phase alternation condition detection system according to the present invention, the color burst signal is directly used to detect the inversion of the burst phase. Therefore, the system is hardly affected by noises and the circuit construction of the system is simplified. Further, there is an advantage that the cost of the system is relatively small.

What is claimed is:

1. A color burst phase detection system comprising:
    input means for receiving a video signal including a color burst signal;
    reference color subcarrier signal generating means for generating a reference color subcarrier signal whose frequency is substantially equal to the frequency of said color burst signal;
    phase comparing means connected to said input means and said reference color subcarrier signal generating means, for phase comparing said color burst signal included in said video signal with said reference color subcarrier signal and producing a phase comparing signal; and
    detection means connected to said phase comparing means, for detecting a level change of said phase comparing signal and producing a burst phase inversion detection signal when said level change of said phase comparing signal exceeds a predetermined reference level.

2. A detection system as set forth in claim 1, wherein said phase comparing means comprises first and second phase comparators whose axes of phase detection are different from each other and producing said first and second phase comparison signals respectively, and wherein said detection means produces said burst phase inversion detection signal when a level change of at least one of said first and second phase comparison signals exceeds said predetermined reference level.

3. A color burst phase detection system as set forth in claim 2, wherein phase detection axes of said pair of phase comparators are substantially perpendicular to each other.

4. A color burst phase detection system as set forth in claim 1, wherein said detection means comprise a burst sample and hold circuit means connected to said phase comparing means for generating a phase difference signal for each burst, a differentiation circuit means connected to said burst sample and hold circuit means for differentiating said phase difference signal and producing a differentiation signal, and a window comparator means connected to said differentiation circuit means for generating an output signal when a level of said differentiation signal is outside of a predetermined reference range.

5. A color burst phase detection system as set forth in claim 3, wherein said detection means comprise a first burst sample and hold circuit means connected to said first phase comparator for generating a first phase difference signal for each burst, a first differentiation circuit means connected to said first burst sample and hold circuit means for differentiating said first phase difference signal and producing a first differentiation signal, a first window comparator means connected to said first differentiation circuit means for generating a first output signal when a level of said first differentiation signal is outside of a predetermined reference range, a second burst sample and hold circuit means connected to said second phase comparator for generating a second phase difference signal for each burst, a second differentiation circuit means connected to said second burst sample and hold circuit means for differentiating said second phase difference signal and producing a second differentiation signal, a second window comparator means connected to said second differentiation circuit means for generating a second output signal when a level of said second differentiation signal is outside of the predetermined reference range, and an OR gate means connected to said first and second window comparator means, for generating the burst phase inversion detection signal when at least one of the first and second output signals is supplied from at least one of said first and second window comparator means.

6. A color burst phase detection system adapted for use in a video information reproducing system including a frame memory, a phase control circuit connected to said frame memory and a switch circuit for selectively supplying one of a video signal from the frame memory and a video signal through the phase control circuit, comprising:
    input means for receiving a video signal including a color burst signal from the frame memory of the video information reproducing system;
    reference color subcarrier signal generating means for generating a reference color subcarrier signal whose frequency is substantially equal to the frequency of said color burst signal;
    phase comparing means connected to said input means and said reference color subcarrier signal generating means, for phase comparing said color burst signal included in said video signal with said reference color subcarrier signal and producing a phase comparing signal; and
    detection means connected to said phase comparing means, for detecting a level change of said phase comparing signal and producing a burst phase inversion detection signal for controlling the switch circuit of the video information reproduction system when said level change of said phase comparing signal exceeds a predetermined reference level.

7. A detection system as set forth in claim 6, wherein said phase comparing means comprising first and second phase comparators whose axes of phase detection are different from each other and producing first and second phase comparison signals respectively, and wherein said detection means produces said burst phase inversion detection signal when a level change of at least one of said first and second phase comparison signals exceeds said predetermined reference level.

8. A color burst phase detection system as set forth in claim 7, wherein phase detection axes of said pair of phase comparators are substantially perpendicular to each other.

9. A color burst phase detection system as set forth in claim 6, wherein said detection means comprise a burst sample and hold circuit means connected to said phase comparing means for generating a phase difference signal for each burst, a differentiation circuit means connected to said burst sample and hold circuit means for differentiating said phase difference signal and producing a differentiation signal, and a window comparator means connected to said differentiation circuit means for generating an output signal when a level of said differentiation signal is outside of a predetermined reference range.

10. A color burst phase detection system as set forth in claim 8, wherein said detection means comprise a first burst sample and hold circuit means connected to said first phase comparator for generating a first phase difference signal for each burst, a first differentiation circuit means connected to said first burst sample and hold circuit means for differentiating said first phase difference signal and producing a first differentiation signal, a first window comparator means connected to said first differentiation circuit means for generating a first output signal when a level of said first differentiation signal is outside of a predetermined reference range, a second burst sample and hold circuit means connected to said second phase comparator for generating a second phase difference signal for each burst, a second differentiation circuit means connected to said second burst sample and hold circuit means for differentiating said second phase difference signal and producing a second differentiation signal, a second window comparator means connected to said second differentiation circuit means for generating a second output signal when a level of said second differentiation signal is outside of the predetermined reference range, and an OR gate means connected to said first and second window comparator means, for generating the burst phase inversion detection signal when at least one of first and second output signals is supplied from at least one of said first and second window comparator means.

* * * * *